United States Patent [19]

Brambach

[11] Patent Number: 5,128,201
[45] Date of Patent: Jul. 7, 1992

[54] FOAMABLE FOIL AND METHOD OF MAKING SAME

[75] Inventor: Johan A. Brambach, Leimuiden, Netherlands

[73] Assignee: Schreiner Luchtvaart Groep B.V., Leiden, Netherlands

[21] Appl. No.: 705,367

[22] Filed: May 24, 1991

[30] Foreign Application Priority Data

May 28, 1990 [NL] Netherlands .................. 9001215

[51] Int. Cl.$^5$ .............................................. B32B 3/26
[52] U.S. Cl. .................................... 428/212; 156/79; 156/308.2; 428/304.4; 428/309.9; 428/318.6; 428/319.3; 428/319.7
[58] Field of Search .............. 428/212, 304.4, 309.9, 428/318.6, 319.3, 319.7; 156/79, 308.2

[56] References Cited

U.S. PATENT DOCUMENTS

| | | | |
|---|---|---|---|
| 2,727,278 | 12/1955 | Thompson | 52/309.5 |
| 3,860,371 | 1/1975 | Willy | 425/115 |
| 4,025,686 | 5/1977 | Zion | 428/285 |
| 4,569,880 | 2/1986 | Nishiyama et al. | 428/212 |
| 4,804,504 | 2/1989 | Lee et al. | 264/26 |
| 4,889,763 | 12/1989 | Brambach | 428/304.4 |

FOREIGN PATENT DOCUMENTS

| | | |
|---|---|---|
| 0278622 | 8/1988 | European Pat. Off. |
| 0345855 | 12/1989 | European Pat. Off. |
| 2146409 | 3/1973 | Fed. Rep. of Germany |

*Primary Examiner*—William J. Van Balen
*Attorney, Agent, or Firm*—Burns, Doane, Swecker & Mathis

[57] ABSTRACT

This invention relates to a method of making a foamable foil of at least one thermoplastic resin with at least one liquid blowing agent incorporated therein, said method comprising forming the thermoplastic resin into a layer between two foils, said resin comprising an excess of blowing agent, to form an assembly comprising at least an intermediate layer of resin with blowing agent and two other layers, whereafter the blowing agent partly diffuses from the intermediate layer.

29 Claims, 1 Drawing Sheet

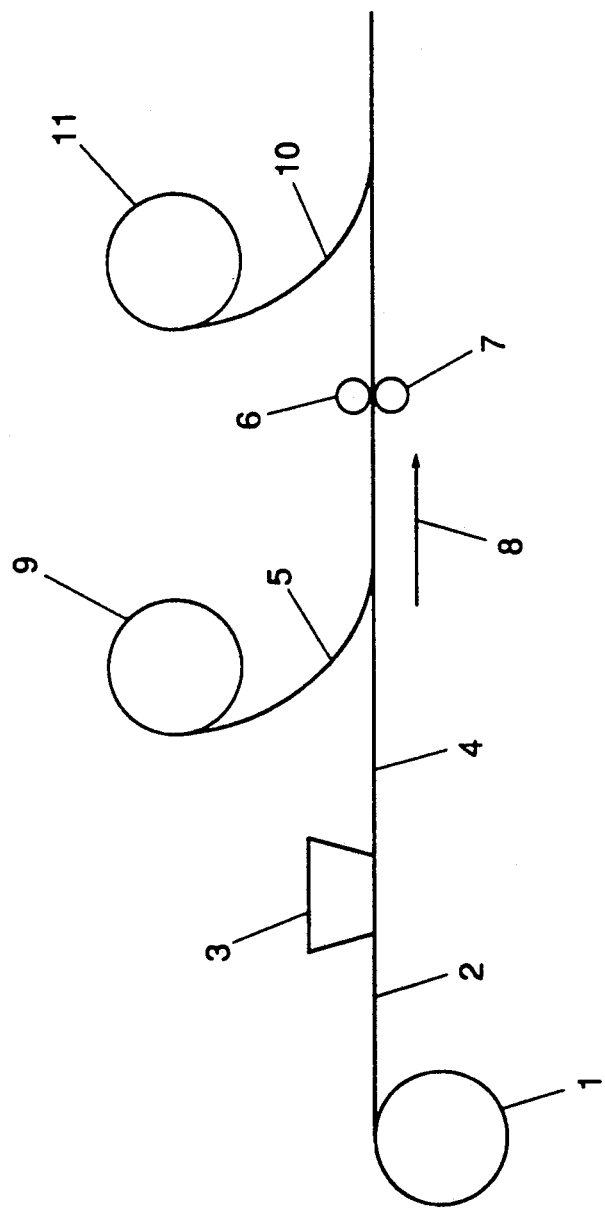

FOAMABLE FOIL AND METHOD OF MAKING SAME

This invention relates to a method of making a foamable foil of at least one thermoplastic resin with at least one liquid blowing agent incorporated therein.

Such a method is known inter alia from European patent application No. 345,855. A method of bonding materials using a foil impregnated with a solvent is also described in European patent application No. 274,789.

The foil described in the first-mentioned patent application has a number of uses, including bonding materials to each other with foaming. Another use of such a foil is the manufacture of sandwich materials, for example as described in European patent applications Nos. 264,495 and 268,148.

Such materials are entirely thermoplastic and consist of a core material which comprises a thermoplastic foam and two top layers consisting of a fibre-reinforced synthetic material such as polycarbonate or polyetherimide.

A foamable foil as described in European patent application No. 345.855 can be used well for the manufacture of such sandwich materials, by providing the foil in unfoamed form between two reinforced top layers and then heating the assembly, so that the foil foams and a sandwich material is formed.

In European patent application No. 345.855 a number of methods are given for manufacturing such a foil, such as 'solvent casting'. The methods described amount to either removing the solvent (=blowing agent) only partly from the synthetic material or afterwards incorporating an amount of blowing agent in the synthetic material.

In the practice of methods wherein the foil is made starting from a solution or dispersion of the synthetic material in a solvent or softening agent for the synthetic material, a number of problems may occur. It has been found that during the removal of the excess solvent or softener, changes occur at the surface of the foil structure which adversely affect subsequent foaming. The reason is that owing to the fast evaporation of the blowing agent, a certain degree of crystallization or 'freezing' of the structure of the synthetic material occurs, with the result that foaming takes place insufficiently, if at all, or that the structure of the foam is poor. Furthermore, in such a method, it is a disadvantage that the volatile agents enter the atmosphere. This requires measures to be taken for the vapours to be caught and/or recovered. It would, therefore, be advantageous if this problem could be solved at the same time.

Surprisingly, it has been found that it is possible to make a foamable foil of at least one thermoplastic resin with at least one blowing agent incorporated therein, starting from a thermoplastic resin with an excess of blowing agent incorporated therein, without any problems occurring with respect to the structure of the foil.

The method according to the invention comprises forming the thermoplastic resin into a layer between two foils, the resin comprising an excess of blowing agent, to form an assembly comprising at least an intermediate layer of resin with blowing agent and two other layers, whereafter the blowing agent partly diffuses from the intermediate layer.

Surprisingly, it has been found that in this way a foamable foil can be made which can be foamed in a reproducible manner without any problems.

According to a first embodiment of the method according to the invention, the liquid or deformable thermoplastic synthetic material is provided between two layers of a foil permeable to the blowing agent. This may for example be a polyester foil. By virtue of the fact that the diffusion of the blowing agent from the intermediate layer is delayed, a foamable foil is obtained having an eminent and reproducible foaming behavior. However, this does not completely solve the environmental problem regarding the evaporation of an organic compound. Naturally, there is no problem when water is used as the blowing agent and/or other compounds which are equally harmless to the environment.

After the desired equilibrium of diffusion has been reached, the other layers are removed. The blowing agent may have diffused through the foil or may have remained behind in it in part or in full. According to this variant of the invention, however, it is normal for said other foils to be removed after the desired equilibrium has been established.

According to a preferred variant of the invention, however, covering layers of a thermoplastic resin are used, with the blowing agent partly diffusing to the covering layers, these covering layers thus becoming a part of the finished foil. This variant of the method according to the invention has one advantage in that a good foil is obtained and another in that no blowing agent enters the environment during manufacture of the foil. Accordingly, no complicated and costly provisions are required for collecting and/or recovering the blowing agent. This method has a further advantage in that it is possible to choose the amount of blowing agent such that after completion of the diffusion process, i.e. after a more or less stable situation has been reached, exactly enough blowing agent is present in the foil. The evident advantage thereof is that no loss of blowing agent occurs while at the same time the method remains simple.

It is important that the materials and the amounts of blowing agent are chosen such that after the partial diffusion of blowing agent from the intermediate layer to the covering layers, the entire assembly forms a coherent foamable foil, i.e. that the product is still, a foil and not some sort of viscous mass.

In the practice of this method, it is possible to start from the same material for the intermediate layer and for the covering layers. It is also possible, however, to utilize different materials for them. In that case, the blowing agent should in principle operate as a blowing agent for all synthetic materials used.

According to yet another variant of the method according to the invention, at least one of the covering layers consists of a foil of a thermoplastic synthetic material which is reinforced with a woven fabric, knitted fabric, fibre web or unidirectionally applied fibres. In such an embodiment of the method according to the invention, generally a lesser excess of blowing agent is used, since a reinforcement in the top layer has an inhibitory effect on diffusion. The advantage of such an embodiment of the invention lies in the fact that in one pass a pre-product for a sandwich material can be made, which through simple heating will expand into a sandwich material having two fibre-reinforced top layers and a foam core. It is possible to make a sandwich material as a semi-finished article as well as to directly make a finished product already having the desired shape.

However, the method according to the invention may also be practiced in such a manner that a core layer of non-impregnated foil is provided on opposite sides with a resin with an excess of blowing agent (the intermediate layer), while at the outer sides a covering layer is provided which may or may not be permeable. Preferably, in such a case an impermeable covering layer is employed, so that all blowing agent diffuses from the two layers to the core layer.

In principle, any thermoplastic resin may function as a synthetic base for the intermediate layer of the foil according to the invention. The thermoplastic resin of the intermediate layer is preferably selected from the group consisting of polyetherimide, polycarbonate, acrylate polymers, styrene polymers, polyether sulfone, polyether ketone, polyether ketone-ketone, polyetherether ketone, polyphenylene oxide, polyphenylene sulfide, and mixtures of two or more of these synthetic materials. Any preference is to a large extent determined by the use the article is intended for. For use in fields where a high mechanical load of the materials may occur, or where strict requirements are set as to the fire-retardant properties of the materials, there is a preference for polyetherimide, polycarbonate, polyether sulfone, polyether ketone, polyether ketone-ketone, polyetherether ketone, and mixtures of two or more of these synthetic materials.

For the covering layers, preferably the same materials are used for the impermeable foil as for the intermediate layer.

The blowing agents are in principle the same as described in European patent application 345.855. Examples thereof are solvents for the thermoplastic resin, physical blowing agents, liquid chemical blowing agents, water and mixtures of two or more of these blowing agents. Examples of blowing agents that can be used include mono-, di-, and trichloromethane, lower hydrocarbons, such as butane, pentane, hexane and the like, understood to include the various isomers thereof, cyclic aromatic and aliphatic hydrocarbons, and the like.

When polyetherimide is used as a thermoplastic resin for the intermediate layer, it is preferable to start from dichloromethane as a blowing agent, because with this combination optimum results can be obtained.

In the top layer, the synthetic materials may be reinforced with glass fibres, polyamide fibres, such as aramid fibres, polyethylene fibres, polyester fibres and carbon fibres.

According to the simplest embodiment of the invention, the intermediate layer consists of two components, namely the resin and the blowing agent. It is not impossible, however, that additives are incorporated in the foil. Examples of such additives are selected inter alia from the group of existing stabilizers, antioxidants, fillers such as fibres and/or liquid crystalline polymers, pigments, flame-retardant additives, other inert additives and mixtures of two or more of the components. Further, a softening agent may be incorporated in the system, the purpose of the softening agent being to lower the temperature at which foaming occurs. In practice, such a softening agent is useful only when no softening of the thermoplastic resin occurs through the presence of a blowing agent for the thermoplastic resin that also acts as a softening agent.

Suitable softeners include the fatty acids and metallic soaps thereof. APP, polybutylene, bitumen, or extender oil such as naphthalenic and paraffinic oil can also be used. For this purpose, it is also possible to use waxes, such as microcrystalline waxes.

In certain cases, it may be advantageous to incorporate fibres into the intermediate layer. During softening and foaming of the foam, the fibres can orient themselves and have a reinforcing function. In this case, it is preferable to start from relatively short and thin fibres, for example having a thickness of the order of a few microns, for example 0.5-5 $\mu$m, and a length of some millimeters at most, for example 0.1-3 mm.

The intermediate layer of the foil according to the invention can be produced in different ways. According to a first method, the starting product is an already existing, extruded or moulded foil, which is then provided with a liquid physical blowing agent by impregnation of the foil with the liquid or through exposure to the vapour thereof. Since this method is rather laborious, it is not preferred. It is also possible to produce a foil by extruding or otherwise shaping a mixture of the thermoplastic resin, the blowing agent and any other components that may be present. According to a third method —and this method is preferred—the foil can be produced by the method of 'solvent-casting', wherein a solution of the thermoplastic resin is formed as an intermediate layer. Surprisingly, it has been found to be possible to form the intermediate layer by applying (pouring) a solution of the thermoplastic resin to a covering layer, and thereupon providing the other covering layer on the intermediate layer.

The blowing agent content in the finished foil may vary within wide limits. The lower limit is determined by the fact that proper bonding requires a certain degree of foaming. Naturally, this is dependent on the specific combination of materials, but a suitable lower limit is a proportion of at least 0.5% by weight of blowing agent, calculated on the weight of the thermoplastic resin and the blowing agent together. Typical content rates range between 1 and 50% by weight. The upper limit is mainly determined by the fact that the foil must still permit handling and must not be too weak.

Preferably the amount of blowing agent in the intermediate layer of the foamable foil is sufficient to result in the foil, after free foaming, having at least about 10% by volume of pores.

A suitable method results in a foamable foil comprising from about 50% to about 99% by weight of thermoplastic resin, from about 1% to about 50% by weight of blowing agent, and up to about 15% by weight of one or more additives selected from the group consisting of stabilizers, antioxidants, fillers, pigments, flame-retardant additives, and mixtures thereof.

The blowing agent content in the intermediate layer is higher than the desired final content in the end product. The magnitude of the excess, however, depends to a great extent on the nature of the materials and the structure of the assembly. Generally, the magnitude of the excess will be between 5 and 250%.

After manufacture of the foil, if so desired, it is cut to size and processed further or stored. When volatile blowing agents are used, it is preferable to provide the foil with a protective foil of a different material, which is preferably hardly permeable, if at all, to the blowing agent. Suitable materials for that purpose are the known barrier materials such as EVA and co-extruded multilayer foils, for example provided with at least one layer of a polyamide. According to a preferred embodiment of the invention, the foil is rolled up with an intermediate layer of a different synthetic foil which is impermeable to the blowing agent.

The foil obtained using the method according to the invention can be employed for the same uses as set forth in European patent application No. 345.855. Examples of such uses are the so-called 'hot-melt adhesives', filler glues, but also the manufacture of sandwich materials as discussed hereinbefore.

One method of making the foil according to the invention will be explained and illustrated, by way of example, with reference to the accompanying drawing, diagrammatically showing the basic principle of a method according to the invention.

A first roll 1, having provided thereon a foil 2 of material for a covering layer, is unrolled in the direction of the arrow 8. A bottomless trough-shaped box 3 is arranged above the covering layer 4. Provided in this trough is a liquid solution of the synthetic material of the intermediate layer. The box is retained in position by means now shown. The box 3 is arranged above the covering layer in such a manner that a layer of the solution of the desired thickness is applied to the covering layer. This may for example be a thickness of 75 $\mu$m. The second covering layer 5 is unrolled from roll 9 and applied to the intermediate layer and the assembly is passed and/or compressed between two rollers 6 and 7.

The assembly thus obtained may then be cut to size, rolled up and/or provided with a foil 10 impermeable to the blowing agent, provided on the roll 11. After the equilibrium of diffusion has been reached, a suitable foamable foil has thus been obtained.

The invention will now be illustrated in and by a non-limiting Example.

EXAMPLE 1

A solution consisting as to 30% by weight of polyetherimide (Ultem (TM)) and as to 70% by weight of dichloromethane was applied with a thickness of 75 $\mu$m on a foil of 75 $\mu$m polyetherimide. On the liquid intermediate layer one similar foil was applied. After establishing the equilibrium of diffusion, a coherent unfoamed foil of a dichloromethane content of approx. 23% by weight was obtained. Upon heating to 175° C. a foam was obtained of a thickness approx. 4 mm and a density of 75 kg/m$^3$.

EXAMPLE 2

In the same manner as described in Example 1 an unfoamed foil was made, which foil was subsequently provided between two layers of a glass-fibre-reinforced polyetherimide. After heating in a mould a sandwich construction was obtained, built up from three layers and having the following properties:
Weight: 2.670 kg/m$^2$
Flexural strength 180 N/mm$^2$
Modulus of shear 10 N/mm$^2$

What is claimed is:

1. In a method for making a foamable foil from at least one thermoplastic resin with at least one liquid blowing agent incorporated therein, the steps of:
   (a) forming a multilayered assembly comprising the thermoplastic resin as an intermediate layer, the amount of blowing agent in the intermediate layer being in excess of that needed to effect foaming of the intermediate layer, and an outer layer positioned on each side of the intermediate layer, at least one of the outer layers being capable of absorbing blowing agent from the intermediate layer; and
   (b) removing the excess blowing agent from the intermediate layer by absorption into the outer layer or layers;
   thereby forming the foamable foil.

2. A method according to claim 1, including the step of
   (c) removing the outer layers from the intermediate layer after the absorption step (b).

3. A method according to claim 1, wherein at least one of the outer layers is permeable to the blowing agent.

4. A method according to claim 2, wherein the outer layers comprise polyester.

5. A method according to claim 1, wherein the absorption of blowing agent into the outer layer or layers in step (b) continues until an equilibrium concentration of blowing agent is approached between the intermediate layer and the outer layers.

6. A method according to claim 1, wherein the outer layers each comprise a thermoplastic resin, and wherein the blowing agent is absorbed by at least one of the outer layers.

7. A method according to claim 6, wherein the intermediate layer and the outer layers comprise the same thermoplastic resin.

8. A method according to claim 6, wherein the thermoplastic resin of the intermediate layer is different from that of each of the outer layers, and wherein the blowing agent is a softening agent for both the intermediate and the outer layers.

9. A method according to claim 6, wherein the foamable foil is coherent after the absorption step (b).

10. A method according to claim 1, wherein the intermediate layer includes fibers.

11. A method according to claim 6, wherein the thermoplastic resin of at least one of the outer layers includes fibers.

12. A method according to claim 7, wherein the thermoplastic resin of at least one of the outer layers includes fibers.

13. A method according to claim 1, wherein at least one of the covering layers comprises a thermoplastic synthetic material reinforced with woven fabric, knitted fabric, fiber web or unidirectionally applied fibers.

14. A method according to claim 1, wherein the thermoplastic resin of the intermediate layer is selected from the group consisting of polyetherimide, polycarbonate, an acrylate polymer, a styrene polymer, polyether sulfone, polyether ketone, polyether ketone-ketone, polyether-ether ketone, polyphenylene oxide, polyphenylene sulfide, and mixtures thereof.

15. A method according to claim 6, wherein the thermoplastic resin of the outer layers is selected from the group consisting of polyetherimide, polycarbonate, an acrylate polymer, a styrene polymer, polyether sulfone, polyether ketone, polyether ketone-ketone, polyether-ether ketone, polyphenylene oxide, polyphenylene sulfide, and mixtures thereof.

16. A method according to claim 1, wherein the blowing agent is selected from the group consisting of solvents for the thermoplastic resin of the intermediate layer, physical blowing agents, liquid chemical blowing agents, water and mixtures thereof.

17. A method according to claim 1, wherein the thermoplastic synthetic material of the intermediate layer is polyetherimide and the blowing agent is dichloromethane.

18. A method according to claim 1, wherein the amount of blowing agent in the intermediate layer of the foamable foil is sufficient to result in the foil, after free foaming, having at least about 10% by volume of pores.

19. A method according to claim 1, wherein the foamable foil comprises from about 50% to about 99% by weight of thermoplastic resin, from about 1% to about 50% by weight of blowing agent, and up to about 15% by weight of one or more additives selected from the group consisting of stabilizers, antioxidants, fillers, pigments, flame-retardant additives, and mixtures thereof.

20. A foamable foil comprising at least one thermoplastic resin having incorporated therein at least one blowing agent in an amount sufficient to effect foaming, wherein the foamable foil is produced by a method comprising:
   (a) forming a multilayered assembly comprising the thermoplastic resin as an intermediate layer, the amount of blowing agent in the intermediate layer being in excess of that needed to effect foaming, and an outer layer positioned on each side of the intermediate layer, at least one of the outer layers being capable of absorbing blowing agent from the intermediate layer;
   (b) removing the excess blowing agent from the intermediate layer by absorption into the outer layer or layers; and
   (c) removing the outer layers from the intermediate layer after the absorption step (b), thereby forming the foamable foil.

21. A foamable foil according to claim 20, wherein the foil is substantially free of crystallization.

22. A foamable foil comprising an intermediate layer of a thermoplastic resin having incorporated therein at least one blowing agent in an amount sufficient to effect foaming, and an outer layer positioned on each side of the intermediate layer, wherein the foamable foil is produced by a method comprising:
   (a) forming a multilayered assembly comprising the intermediate layer, the amount of blowing agent in the intermediate layer being in excess of that needed to effect foaming of the intermediate layer, and the outer layers positioned on each side of the intermediate layer, at least one of the outer layers being capable of absorbing blowing agent from the intermediate layer; and
   (b) removing the excess blowing agent from the intermediate layer by absorption into the outer layer or layers, thereby forming the foamable foil.

23. A foamable foil according to claim 22, wherein the foil is substantially free of crystallization.

24. In a method for making a foamable foil from at least one thermoplastic resin with at least one liquid blowing agent incorporated therein, the steps of:
   (a) forming a five layered assembly comprising a core layer capable of absorbing blowing agent, an intermediate layer positioned on each side of the core layer, the intermediate layers comprising the thermoplastic resin, wherein the amount of blowing agent in each of the intermediate layers is in excess of that needed to effect foaming of the intermediate layers, and outer layers placed over each of the intermediate layers on the side opposite that of the core layer; and
   (b) removing excess blowing agent from the intermediate layers by absorption at least into the core layer.

25. A method according to claim 24, wherein the outer layers are impermeable to the blowing agent.

26. A foamable foil comprising a five layered assembly having a core layer, a foamable intermediate layer positioned on each side of the core layer, and outer layers placed over each of the intermediate layers on the side opposite that of the core layer, the intermediate layers comprising a thermoplastic resin having incorporated therein a blowing agent, the foil produced by a method comprising:
   (a) forming a five layered assembly comprising a core layer capable of absorbing blowing agent, a foamable intermediate layer positioned on each side of the core layer and containing blowing agent in an amount in excess of that needed to effect foaming, and outer layers placed over each of the intermediate layers on the side opposite that of the core layer; and
   (b) removing excess blowing agent from the intermediate layers by absorption at least into the core layer.

27. A foamable foil according to claim 26, wherein the outer layers are impermeable to the blowing agent.

28. A foamable foil comprising a five layered assembly having a core layer, a foamable intermediate layer positioned on each side of the core layer, and outer layers placed over each of the intermediate layers on the side opposite that of the core layer, the intermediate layers containing a blowing agent in an amount sufficient to effect foaming, and the core layer having absorbed therein an amount of blowing agent wherein the concentration of blowing agent in the core layer and the intermediate layers is in substantial equilibrium.

29. A foamable foil according to claim 28, wherein the outer layers are impermeable to the blowing agent.

* * * * *